United States Patent [19]
Kneezel et al.

[11] Patent Number: 5,731,824
[45] Date of Patent: Mar. 24, 1998

[54] INK LEVEL SENSING SYSTEM FOR AN INK JET PRINTER

[75] Inventors: Gary A. Kneezel, Webster; Joseph F. Stephany, Williamson; William R. Burger, Fairport, all of N.Y.

[73] Assignee: Xerox Corporation, Stamford, Conn.

[21] Appl. No.: 574,090

[22] Filed: Dec. 18, 1995

[51] Int. Cl.⁶ .................................................. B41J 2/195
[52] U.S. Cl. ................................................................. 347/7
[58] Field of Search ................................... 347/7, 19, 14, 347/85, 86, 87; 73/296; 177/45, 211, 225

[56] References Cited

U.S. PATENT DOCUMENTS

| | | | |
|---|---|---|---|
| Re. 32,572 | 1/1988 | Hawkins et al. | 156/626 |
| 4,337,468 | 6/1982 | Mizuno | 347/7 |
| 4,342,042 | 7/1982 | Cruz-Uribe et al. | 346/140 R |
| 4,422,084 | 12/1983 | Saito | 347/7 |
| 4,571,599 | 2/1986 | Rezanka | 346/140 R |
| 4,605,503 | 8/1986 | Bistad et al. | 210/651 |
| 4,639,738 | 1/1987 | Young et al. | 346/75 |
| 4,670,007 | 6/1987 | Wheeldon et al. | 605/65 |
| 5,079,570 | 1/1992 | Mohr et al. | 346/140 R |
| 5,136,305 | 8/1992 | Ims | 346/1.1 |
| 5,221,397 | 6/1993 | Nystrom | 156/273.5 |
| 5,289,211 | 2/1994 | Morandotti et al. | 346/140 R |
| 5,386,224 | 1/1995 | Deur et al. | 347/7 |
| 5,414,452 | 5/1995 | Accatino et al. | 347/7 |
| 5,434,603 | 7/1995 | Hunt | 347/7 |

Primary Examiner—Benjamin R. Fuller
Assistant Examiner—Craig A. Hallacher

[57] ABSTRACT

The invention discloses a system and method for sensing changes in the weight of an ink reservoir which supplies ink to a printhead which ejects ink onto a recording medium during a printer operational mode. The ink reservoir, whether located separately from the printhead, as in a plotter or pagewidth printer embodiment, or mechanically attached to the printhead and moved in a scanning printhead architecture, has its weight supported by a structure. A strain gage or other weight sensor is affixed to the supporting structure and incorporated in a circuit which produces an output signal representative of resistive changes in the weight sensor. Since a resistive change in the weight sensor is caused by a decrease in the supply of ink in the reservoir during continued printer operation, the output signal is proportional to the ink level. The output signal is digitized and sent to a system controller where it is compared to a predetermined reference level and a low level output signal is generated for use as a warning to a operator or user.

In one embodiment, the strain gage is a leg of a resistor in a bridge circuit and provides continuous ink level readout. In another embodiment, multiple warning levels are enabled by inserting the resistor in a circuit where comparators compare the resistance of the strain gage to reference resistance levels.

12 Claims, 6 Drawing Sheets

INK LEVEL SENSING SYSTEM FOR AN INK JET PRINTER

BACKGROUND AND MATERIAL DISCLOSURE STATEMENT

The present invention relates to ink jet printers and, more particularly, to an ink level sensing system that detects when the level of ink in a supply container is at or below predetermined levels.

Ink jet printers eject ink onto a print medium such as paper in a controlled pattern of closely spaced dots. To form color images, multiple ink jet printheads are used, with each head being supplied with ink of a different color from an associated ink cartridge.

Thermal ink jet printing systems use thermal energy selectively produced by resistors located in capillary filled ink channels near channel terminating nozzles or orifices to vaporize momentarily the ink and form bubbles on demand. Each temporary bubble expels an ink droplet and propels it toward a recording medium. The printing system may be incorporated in either a carriage type printer or a pagewidth type printer. A carriage type printer generally has a relatively small printhead containing the ink channels and nozzles. The printhead is usually sealingly attached to an ink supply cartridge and the combined printhead and cartridge assembly is reciprocated to print one swath of information at a time on a stationarily held recording medium, such as paper. After the swath is printed, the paper is stepped a distance equal to the height of the printed swath, so that the next printed swath will be contiguous therewith. The procedure is repeated until the entire page is printed. In contrast, the pagewidth printer has a stationary printhead having a length equal to or greater than the width of the paper. The paper is continually moved past the pagewidth printhead in a direction normal to the printhead length at a constant speed during the printing process. Moving carriage type ink jet printers must either carry the ink reservoir along with the printhead or provide a flexible ink supply line between the moving printhead and a stationary ink reservoir. Pagewidth printers have an ink supply cartridge located outside the print zone and directly connected to the printbar ink channels.

Wide format thermal ink jet printers, such as plotters, use a relatively large amount of ink per print. In order to minimize the number of times that an emptied ink supply must be changed, it is preferable to have ink supplies containing large amounts of ink (on the order of 0.1 to 1 liter or more per color). In such applications of the moving carriage type, it is advantageous to use a relatively large stationary ink reservoir and a flexible supply line arrangement to a movable small ink reservoir that is attached to the moving printhead. This is because the carriage providing the printhead motion is subjected to periodic accelerations at the ends of scan. Therefore, a large carriage mounted ink reservoir would require a large drive motor along with robust structure in order to achieve rapid carriage accelerations and accurate control of the printhead position. Small carriage mounted disposable ink reservoirs suffer the disadvantage of requiring frequent replacement. Such disposable ink reservoirs are sometimes bundled with the ink jet printhead so that both are discarded when the cartridge is empty.

For either a partial width printhead on a moving carriage or a pagewidth printer, it is desirable to have a low ink level warning to alert a user to replace or refill the ink cartridge so that the ink does not run out during a print job. Presently, for some applications (such as plotting), some users choose to install new print cartridges prior to starting an extensive printing job because it is less costly to replace a questionable cartridge rather than have one or more colors lost in the output prints.

Various prior art methods and devices are known for detecting reduced or low levels of ink in an ink supply container. U.S. Pat. No. 4,342,042 discloses an ink sensing system which includes output from an LED sensor reflected from a flexible membrane which serves as the upper surface of an ink supply reservoir. The membrane contracts as the ink level is depleted, and the LED sensor detects the contraction and generates a low ink level signal.

U.S. Pat. No. 5,079,570 provides a method for detecting ink levels in an ink cartridge where the ink is supplied from a foam reservoir. A binary fluidic indicator is fluidly coupled with the foam reservoir and is triggered when the fluid level in the foam reaches a certain prescribed level.

U.S. Pat. No. 5,289,211 discloses a low ink detecting system which includes a pair of electrodes immersed in the ink impregnated foam reservoir. The electrodes are connected to a bridge circuit which measures the electrical resistance of the ink between the two electrodes.

U.S. Pat. No. 5,414,452 uses a logic circuit which counts the number of drops expelled and compares the instant number with the maximum number of drops equivalent to a known value of ink in the ink reservoir.

U.S. Pat. No. 5,434,603 discloses a visual indicator system where sidewalls of the reservoir retreat inwardly during ink depletion changing the orientation of indicator stripes and modifying the color visible to an observer through a window.

U.S. Pat. No. 5,386,224 places a level sensing probe into the ink supply and senses electrical conductivity changes of the ink.

U.S. Pat. No. 5,136,305 discloses a low ink detecting system wherein a thermistor is placed in the ink supply and periodically energized. The temperature rise of the ink is measured and compared with pre-established values to determine the ink depletion state of the reservoir.

U.S. Pat. No. 4,639,738 discloses a detection system which incorporates detection ports in the cartridge for detecting pressure conditions in the top and bottom of the cartridge. The ports are coupled to a pressure differential sensor that signals a refill condition.

These prior art references typically rely on inferring the ink usage, or they rely on intrusive detection techniques which have implications on materials compatibility between the probe or other components with the ink.

SUMMARY OF THE INVENTION

In a preferred embodiment of the present invention, there is provided a relatively simple and direct but nonintrusive measurement system for detecting low levels of ink in a supply reservoir to an associated printhead. The ink reservoir, whether attached to the printer and carried on a scanning carriage, or located in a stationary fashion outside of the print zone, is mounted on a support platform in such a way that the platform supports at least the weight of the ink reservoir. A weight sensor, such as a strain gage or a load cell or a weigh module, is affixed to the platform and incorporated into a circuit which provides a signal output representative of the changes in weight of the platform and thus to changes in weight of the supported ink reservoir. This output signal is digitized and sent to a computer to produce a display or warning indicating to a user that a low ink level condition exists.

In another embodiment, an ink supply reservoir incorporates an ink bag which is suspended within the reservoir housing so that the weight of the ink bag is sensed by tension or compression on a strain gage or other weight sensor.

More particularly, the present invention relates to an ink level sensing system for an ink jet printer which comprises, in combination, at least one printhead assembly with an associated ink supply reservoir for providing ink from the reservoir to the printhead, the sensing system including:

- a supporting means for accommodating the weight of at least the ink reservoir,
- a weight sensor affixed to said supporting means for sensing the change in ink capacity of the ink reservoir as ink is depleted therefrom, said sensor forming part of a circuit for generating an output signal representative of the ink level in said reservoir.

Further, the invention is directed towards a method for monitoring the ink level of an ink reservoir supplying ink to an ink jet printhead and for generating a signal representing a low ink level including the steps of:

a) establishing a reference signal level in a comparator circuit in a system controller, the reference signal level corresponding to a predetermined low level of ink in said reservoir, b) monitoring the change in weight of the ink in said reservoir and generating electrical signals representative of said weight, c) applying said electrical signals to said controller circuit and d) generating an output low ink level signal when said electrical signal meets or exceeds said predetermined reference signal.

DESCRIPTION OF THE INVENTION

Figure 1:
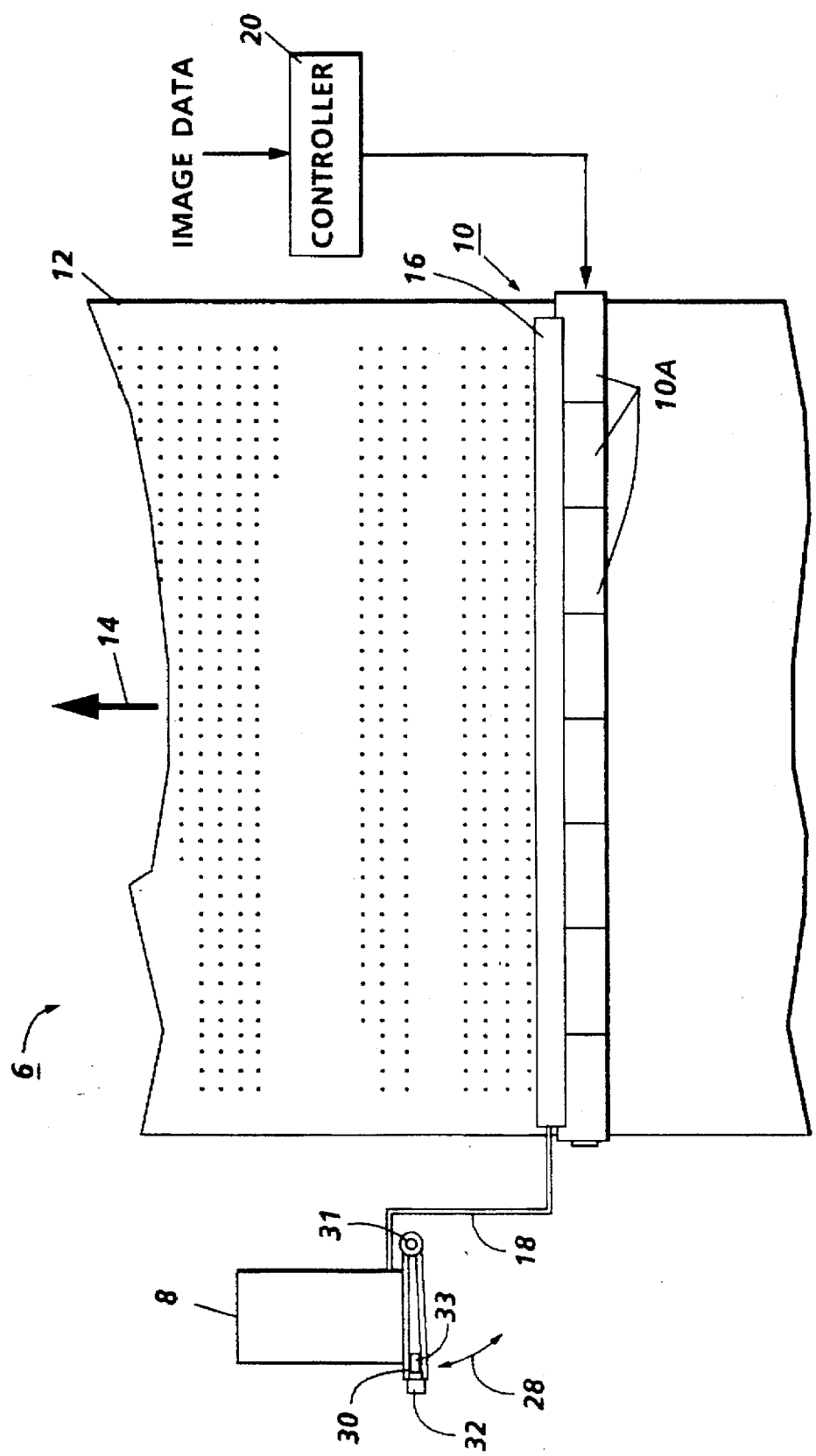
FIG. 1 shows the ink level sensing system of the present invention incorporated into a pagewidth ink jet printer.

FIG. 1 shows a pagewidth (full width) ink jet printing system which is supplied with ink from an ink reservoir 8 whose ink level is monitored by an ink level sensing system according to the invention. The ink level sensing system is applicable to ink jet plotters and other types of printers including systems where partial width printheads are mounted on a scanning carriage which is then moved through a print zone as described in detail below.

Referring to FIG. 1, a full width black printhead 10 is positioned to write on a recording medium 12 which is indexed and moves in the direction of arrow 14. Printhead 10 has been assembled from a plurality of modules 10A which have been butted together to form a 12" array according to the techniques described in U.S. Pat. No. 5,221,397, whose contents are hereby incorporated by reference. Printhead 10, in this embodiment, provides 7,200 nozzles or jets. As described in the No. '397 patent, the printhead modules 10A are formed by precisely bonding together a channel array containing arrays of recesses that are used as sets of channels and associated ink reservoirs and a heater wafer containing heater elements and addressing circuitry. The bonded wafers are diced to form printhead modules resulting in formation of the jets, each nozzle or jet associated with a channel with a heater therein. The heater is selectively energized to heat the ink and expel an ink droplet from the associated jet. The ink channels are combined into a common ink manifold 16 mounted on the side of printhead 10 and in sealed communication with the ink inlets of the channel arrays through aligned openings. The manifold 16 is supplied with the appropriate ink, black for this embodiment, from an ink cartridge 8 via flexible tubing 18.

Image data signals are applied to printhead 10 via controller 20. Controller 20 supplies the driving data and control signals to the heat generating resistors formed in the channels of printhead 10. The signals are conventionally applied via wire bonds (not shown) to driver circuitry and logic on each module 10A. Controller 20 may take the form of a microcomputer including a CPU, a ROM for storing complete programs, and a RAM. Controller 20 controls the feeding of the recording sheet 12 as well as other printer functions described below.

When a line recording operation is performed, each resistor associated with a jet in printhead 10 is driven selectively in accordance with image data so that the ink droplets are ejected from the associated jets forming a line of recording on the surface of the recording medium 12. With continued operation of the printhead, ink container reservoir 8 becomes depleted. The ink level begins to drop and, more significantly for the purposes of the present invention, the combined weight of the reservoir housing and ink decreases. According to the invention, this change in weight is sensed and converted into electrical signals which correspond to predetermined low levels of operation resulting in a low level signal being generated. Reservoir 8 rests with its full weight upon a platform 30. Affixed to the platform 30 is a weight sensor which, in a preferred embodiment, is strain gage 32. Platform 30 may be constructed of suitable materials and geometries such that the portion to which the strain gage is bonded is sufficiently compressible so that weight changes on the order of 1 to 10 grams may be detected. For example, as shown in FIG. 1, the platform may be connected to hinge 31 to provide a degree of motion as shown by arrow 28, with a readily compressible member 33 (e.g. rubber or foam plastic) and strain gage 32 opposite the hinge 31 so that small changes in weight may be sensed. Alternatively, the platform may sit on one or more rubber legs of small cross-sectional area to which the strain gage is bonded. The strain gage which can be, for example, an alloy wire or foil (e.g., nickel-iron, nickel chrome, or copper-nickel alloy), or a semiconductor (e.g. silicon), acts as a transducer whose resistance changes in response to dimensional changes of the platform (or its supporting members) caused by the weight changes of the supported reservoir. By using the circuitry shown in FIG. 2, a digital output signal is generated which is fed back to controller 20 which, in turn, provides a visible and/or audible low ink level warning signal at a control panel.

Figure 2:
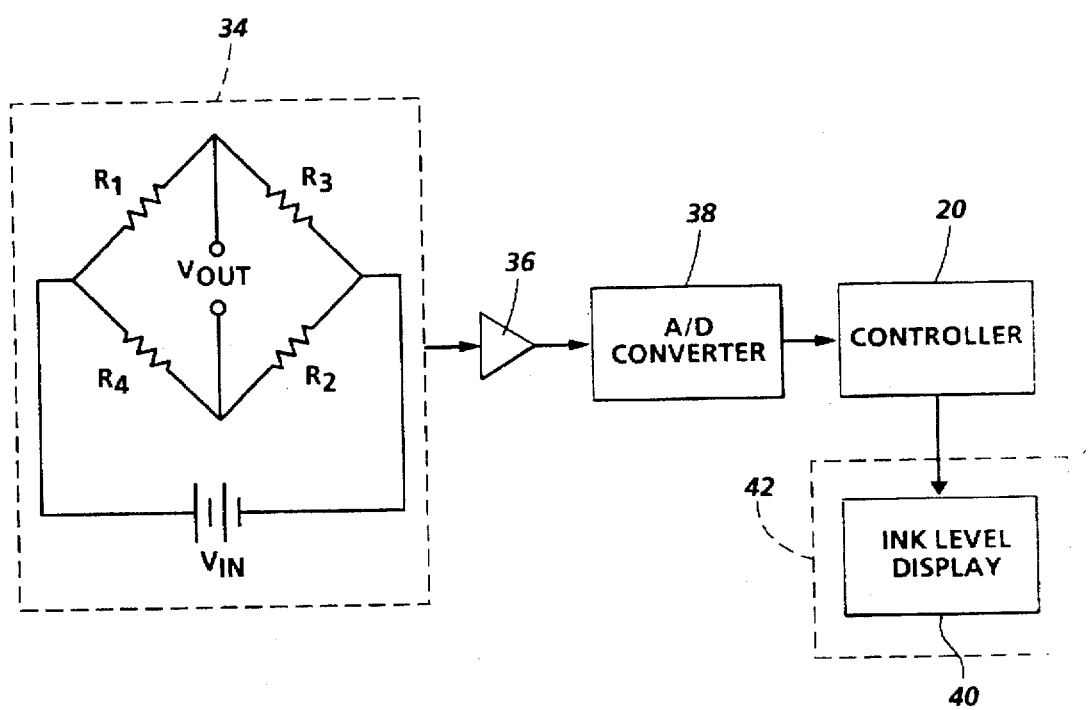
FIG. 2 shows the circuitry for generating a continuous ink level signal.

Referring to FIG. 2, there is shown a bridge circuit 34 having four resistor legs R1–R4. R1 represents the strain gage 32 which, in a preferred embodiment, is a uniaxial wire type gage. While R1 is bonded to the surface of platform 30 (or to a supporting member), the remainder of the resistor legs can be formed on an insulated circuit board attached to the platform. The general bridge equation is $$V_{out} = \frac{V_{in}(R_1 R_2 - R_3 R_4)}{(R_1 + R_3)(R_2 + R_4)} \quad (1)$$

By setting $R_2 = R_4$, this simplifies to $$V_{out} = \frac{V_{in}(R_1 - R_3)}{2(R_1 + R_3)} \quad (2)$$

If $R_1 = r_o(1+gW)$ where g is related to the strain gage sensitivity and W is the weight of reservoir 8, and if $R_3$ is trimmed to be equal to $r_o$, and if $gw \ll 1$, then $$V_{out} = \frac{V_{in} gW}{2(2+gW)} \approx \frac{V_{in} gW}{4} \quad (3)$$

$V_{out}$ changes in response to changes in the resistance of $R_1$, the resistance of $R_1$ changes in relation to the dimensional change of the platform due to the decreasing weight of reservoir 8.

$V_{out}$ is amplified by amplifier 36 and converted into a digital signal at A/D converter 38. The digital output is then fed back to controller 20 which compares the signal with a predetermined low ink reference level signal. When the predetermined low level signal is reached, an ink level signal is generated and sent to ink level display 40 on printer control panel 42. An operator or user is then alerted to refill or replace reservoir 8. Alternatively the digital signal can be read as a graphic display on the user's computer in a form analogous to a fuel gauge or other readout which can provide a continuous monitoring of available ink.

Figure 3:
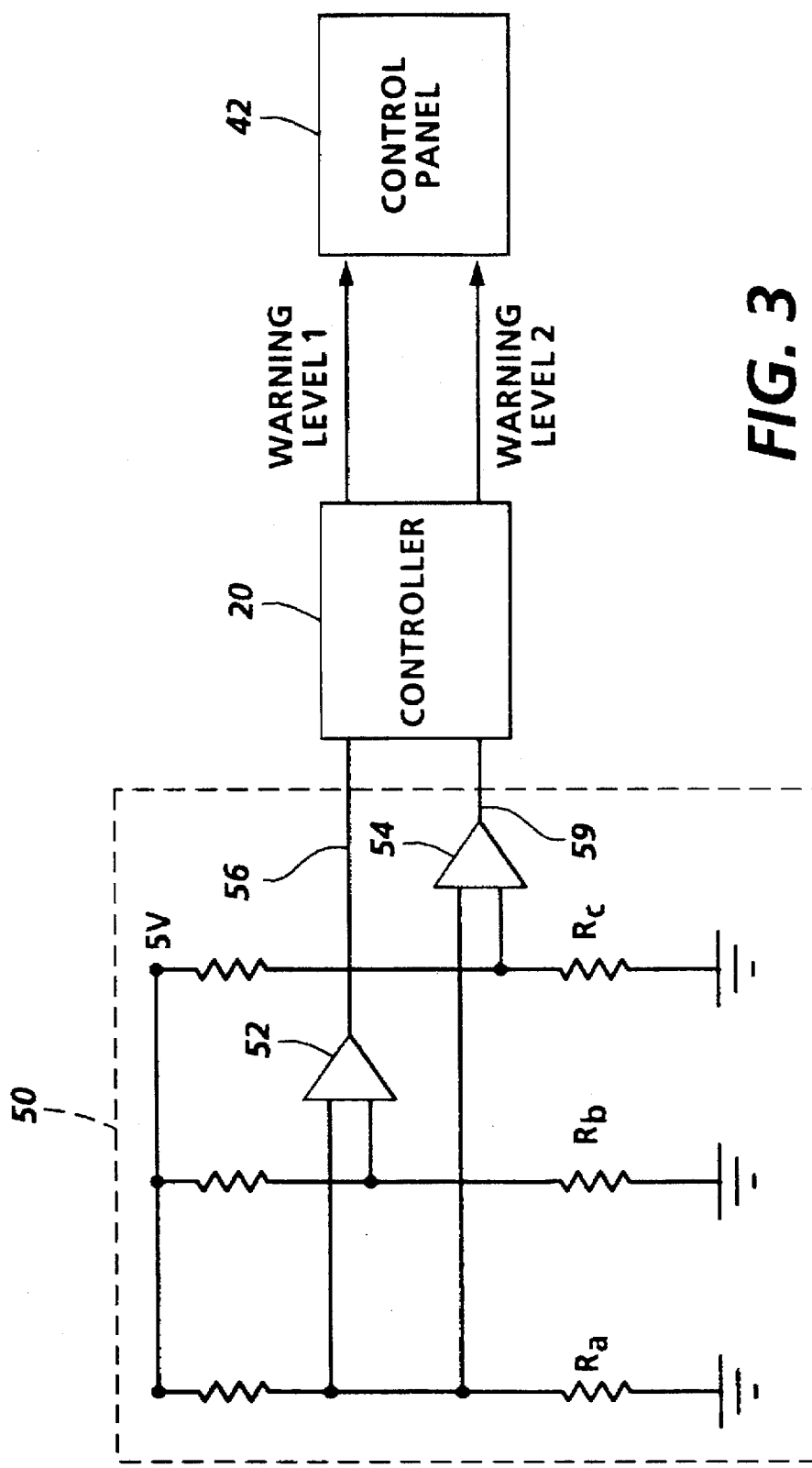
FIG. 3 shows the circuitry for generating two low ink level signals.

Other bridge variants are possible for eliminating temperature offsets, or for putting additional gages in opposite legs of the bridge to increase sensitivity. FIG. 3 shows another, simpler, circuit 50 which can be used in place of bridge circuit 34 and A/D converter 38 of FIG. 2. The circuit of FIG. 3 provides two warning signal outputs corresponding to two sensed ink levels. Comparators 52 and 54 are used to sense the strain gage resistance $R_a$ (gage 32) relative to reference resistors $R_b$, $R_c$. The value of $R_b$ can be selected to provide an output signal representing, for example, an 80% depletion of ink from reservoir 8. The output signal 56 is sent to controller 20 which compares this signal with a predetermined reference level. A "Warning Level 1" output signal is then generated and sent to control panel 42. Similarly, the output of $R_c$ is selected to produce an output signal 59 representing, for example, a 90% depletion of ink from reservoir 8. The output signal 58 is sent to controller 20 which compares the signal with a predetermined reference level. A "Warning Level 2" output signal is then generated and sent to the control panel. This two level sensing system gives a user additional latitude to continue or discontinue a particular print operation. Additional warning levels may be implemented, if desired.

While the embodiment of FIG. 2 showed an ink level sensing system used in a pagewidth print system wherein the ink reservoir was located at a fixed position outside the print zone, the invention can also be used in a scanning type of system wherein one or more partial width array printheads are mounted on a scanning carriage. The ink supply may be located in a fixed position and attached to the printhead by flexible hoses. In this case the weight measurement of the ink supply could be similar to that described above. Alternatively the ink supply may be integrated with the printhead on the scanning carriage. Weight measurements for this architecture are described below.

Figure 4:
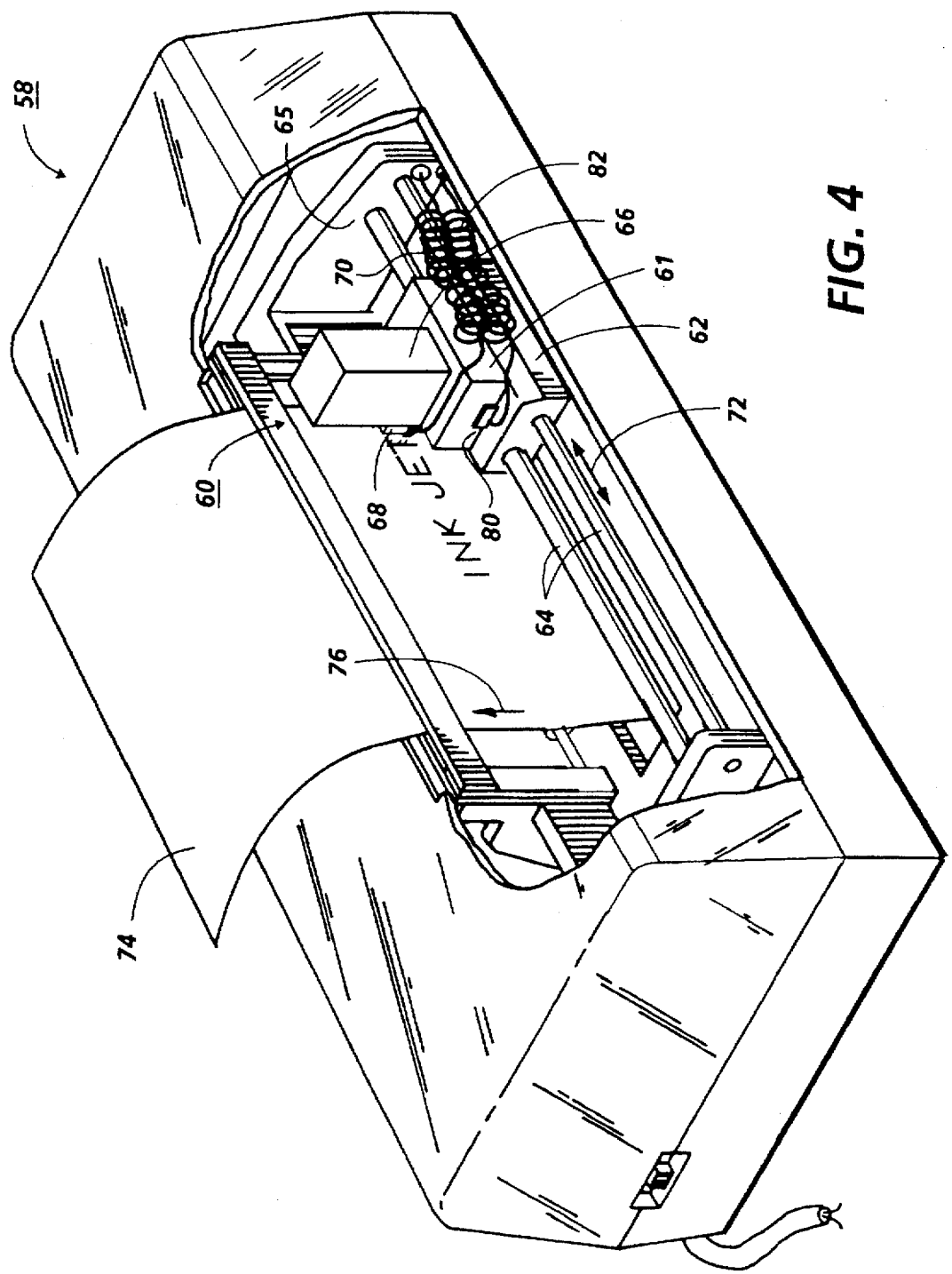
FIG. 4 shows the ink level sensing system of the present invention incorporated into a scanning ink jet printer.

FIG. 4 illustrates a perspective view of an ink jet printer 58 having an ink jet printhead cartridge 60 mounted on platform 61 which, in turn, is mounted on carriage 62 supported by carriage rails 64. The carriage rails are supported by a frame 65 of the ink jet printer 58. The printhead cartridge 60 includes a reservoir 66 containing ink for supply to a thermal ink jet printhead 68 which selectively expels droplets of ink under control of electrical signals received from a controller (not shown but functionally equivalent to controller 20 of FIG. 1) of the printer 58 through an electrical cable 70. The printhead 68 contains a plurality of ink channels (not shown) which carry ink from the reservoir 66 to respective ink ejecting orifices or nozzles (also not shown). When printing, the carriage 62 reciprocates back and forth along the carriage rails 64 in the direction of the arrow 72. As the printhead cartridge 60 reciprocates back and forth across a recording medium 74, such as a sheet of paper or a transparency, droplets of ink are expelled from selected ones of the printhead nozzles towards the sheet of paper. Typically during each pass of the carriage 62 the recording medium 74 is held stationary. At the end of each pass, however, the recording medium 74 is stepped in the direction of the arrow 76. For a more detailed explanation of the printhead and printing thereby, refer to U.S. Pat. No. 4,571,599 and U.S. Pat. No. Reissue 32,572, the relevant portions of which are incorporated herein by reference.

According to the invention, a strain gage 80 is bonded to the side of platform 61. Gage 80 functions as part of a bridge circuit of the type described, for example, in connection with FIG. 2. The output $V_o$ which represents the resistive change of strain gage 80 caused by the change in the combined weight of reservoir 66 and printhead 68, is connected, via electrical cable 82 to an amplifier. The output is amplified, converted to a digital signal, and sent to a controller which compares the signal to a predetermined low ink reference level and generates an appropriate low ink level warning output signal. It may be preferable to make the ink weight readings when the printhead is in a stationary position so that accelerations or ink sloshing to not result in false readings at the strain gage.

Figure 5:
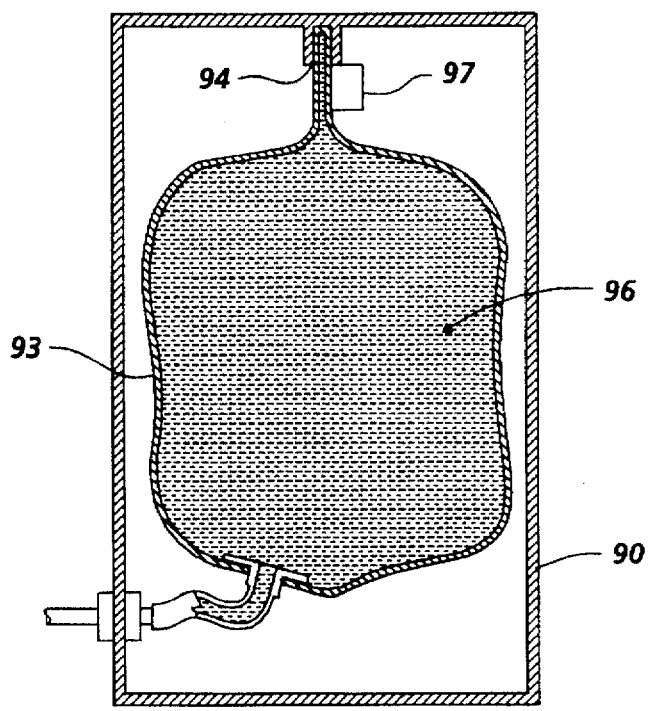
FIG. 5 shows the sensing system of the present invention used in a printer having a cartridge containing the ink supply in a bag suspended interiorly in the cartridge.

FIG. 5 shows a still further variation of the invention adapted for use in an ink jet printer having a cartridge 60 configuration in which the printhead 62 and the ink reservoir 66 are integrated mechanically. The ink within the reservoir is contained in a bag 93 suspended by a suspension member 94 so that the bottom of the bag is clear of the reservoir floor. A strain gage 97 is bonded to the suspension member. The weight of the ink bag is detected by the tension on the strain gage.

Figure 6:
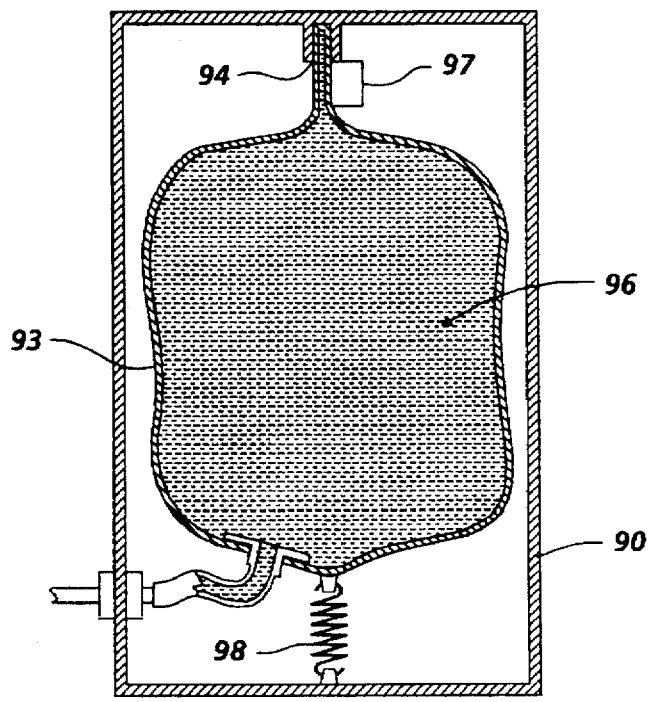
FIG. 6 shows the sensing system of the present invention used in a printer having a cartridge containing the ink supply in a bag suspended interiorly in the cartridge and pulled by a spring toward the bottom of the cartridge.

An alternative embodiment for a cartridge configuration is shown in FIG. 6 wherein a spring 98 is connected to the bottom of the suspended bag 93. When the bag 93 is full, the spring 98 is stretched, thereby putting a relatively large force on the strain gage 97 which is affixed to the suspension member 94. As the bag 93 empties, it elongates so that the spring tension relaxes and puts less force on the strain gage. Although this embodiment employs a strain gage and a suspended ink supply, its method of detecting changes in the quantity of ink is somewhat different than those described above. Rather than sensing weight changes of the ink, it relies on the shape change of the emptying ink bag, and therefore is measuring a volume change. Both types of ink quantity change sensing methods (weight or volume) are thus comprehended here.

Figure 7:
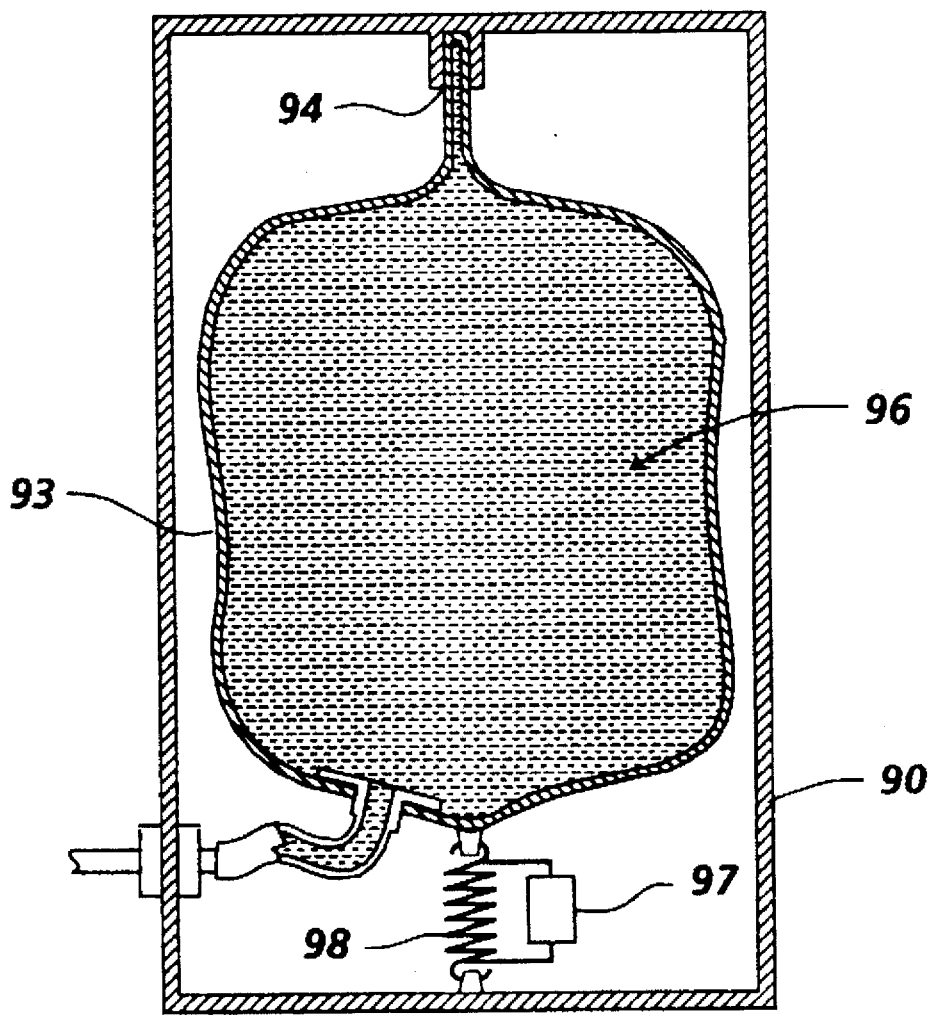
FIG. 7 shows a modification of the FIG. 6 configuration in which the sensor is placed across the pulling spring rather than on the suspending member.

FIG. 7 is a modification of the configuration shown in FIG. 6. In this case the strain gage 97 is placed across the pulling spring 98, rather than across the suspension member 94. Optionally, the strain gage and tension spring may be combined into the same unit. For example, the device could be a block of conductive rubber or plastic which would change in resistance while providing the required tension.

In the embodiments FIG. 5 through 7, the strain gage would be part of the cartridge and would be replaced when the cartridge is replaced, but it would allow wider applicability to the case where the cartridge is externally clamped, and the ink source is internal to the cartridge.

While the embodiment disclosed herein is preferred it will be appreciated from this teaching that various alternative modifications, variations or improvements therein may be made by those skilled in the art which are intended to be encompassed by the following claims:

What is claimed is:

1. An ink level sensing system for an ink jet printer which comprises, in combination, at least one printhead assembly with an associated ink supply reservoir for providing ink from the reservoir to the printhead, the sensing system including:

a supporting means for accommodating a weight of at least the ink reservoir, a strain gauge having a resistance which changes in proportion to a change in weight of the ink reservoir affixed to said supporting means for sensing a change in ink level of the ink reservoir as ink is depleted therefrom, said sensor forming part of a circuit for generating an output signal representative of the ink level in said reservoir and an ink status indicator for generating a visual or audible representation of the ink level.

2. The system of claim 1 wherein the sensor is a strain gage whose resistance changes in response to the relaxation of a collapsible ink bag as ink is depleted therefrom.

3. The system of claim 1 wherein said circuit is a bridge circuit which includes a strain gauge as one of the resistive legs.

4. The system of claim 3 wherein the output of said bridge circuit is an analog signal, said system further including means to change said analog signal to a digital signal and controller means for comparing the digital signal to a signal representing a predetermined ink level and for generating a low ink output signal.

5. The system of claim 3 wherein the output of said bridge circuit is an analog signal, said system further including means to provide a substantially continuous readout of ink level.

6. The system of claim 1 wherein said circuit includes a plurality of reference resistors and a plurality of comparators which sense a strain resistance of the weight sensor relative to at least one of the reference resistors, the circuit generating an output signal corresponding to the level of ink in said reservoir.

7. The system of claim 6 further including means to change an analog signal to a digital signal and controller means for comparing the digital signal to a signal representing a predetermined ink level and for generating a low ink output signal.

8. The system of claim 1 wherein said printhead assembly includes at least one full width printhead which ejects ink droplets along a width of a printing zone and wherein said ink reservoir support is located outside of said printing zone.

9. The system of claim 1 wherein said printhead assembly is mounted on a carriage which is moved along a printing zone with each droplet being expelled from said printhead, said printhead being connected to an ink reservoir on a stationary support located outside of said printing zone.

10. The system of claim 1 wherein said printhead assembly and said ink supply reservoir are mounted on a carriage which is moved along a printing zone with each droplet being expelled from said printhead, said ink reservoir support mounted on said carriage.

11. A method for monitoring ink level of an ink reservoir supplying ink to an ink jet printhead and for generating a signal representing a low ink level including the steps of:

a) establishing a reference signal level in a comparator circuit in a system controller, the reference signal level corresponding to a predetermined low level of ink in said reservoir, b) monitoring a change in weight of the ink in said reservoir and generating electrical signals representative of said weight, c) applying said electrical signals to said controller circuit and d) generating an output low ink level signal when said electrical signal meets or exceeds said predetermined reference signal.

12. A method for monitoring an ink level of an ink reservoir supplying ink to a printhead comprising the steps of:

a) providing a support for the ink reservoir b) affixing a weight sensor to the ink reservoir support, the weight sensor having an output corresponding to changes in weight of the ink in the reservoir due to depletion during operation and c) incorporating said weight sensor in an electrical circuit which generates an output analog signal representing changes in weight sensor resistance.

* * * * *